United States Patent
Willix

(10) Patent No.: US 8,006,704 B1
(45) Date of Patent: Aug. 30, 2011

(54) PET NAIL FILING DEVICE

(76) Inventor: Bill Willix, Netcong, NJ (US)

(*) Notice: Subject to any disclaimer, the term of this patent is extended or adjusted under 35 U.S.C. 154(b) by 379 days.

(21) Appl. No.: 12/290,493

(22) Filed: Oct. 31, 2008

Related U.S. Application Data

(63) Continuation-in-part of application No. 11/147,841, filed on Jun. 8, 2005, now abandoned.

(51) Int. Cl.
*A45D 29/05* (2006.01)
(52) U.S. Cl. ...................... 132/73.6; 119/610
(58) Field of Classification Search ............ 132/73, 132/73.5, 74.5, 73.6, 75.6, 75.8, 76.4; 451/355, 451/297; 119/610, 608
See application file for complete search history.

(56) References Cited

U.S. PATENT DOCUMENTS

| | | | | |
|---|---|---|---|---|
| 2,566,809 | A | * | 9/1951 | Risley et al. .................. 451/311 |
| 3,754,556 | A | * | 8/1973 | Watkins ........................ 132/73.6 |
| 2009/0056732 | A1 | * | 3/2009 | Drelinger ..................... 132/73.6 |

* cited by examiner

*Primary Examiner* — Rachel Steitz
(74) *Attorney, Agent, or Firm* — Goldstein Law Offices, P.C.

(57) ABSTRACT

A pet nail filing device for filing down a pet's nails in a quick and painless fashion. The filing device has a housing and a rotating grinding drum within the housing. A motor is connected to a drive belt which causes the grinding drum to rotate while isolating the grinding drum, and thus the animal, from vibration. The grinding drum has an outer surface covered with grit. When the pet's nail is brought into contact with the drum outer surface, the grit coupled with the rotation of the drum both conditions the nail for grooming by causing the vein to retract, and also causes the nail to be filed down. A mask cover exposes only a portion of the grinding drum through openings therein, and thereby avoids trauma to the animal.

4 Claims, 2 Drawing Sheets

PET NAIL FILING DEVICE

CROSS REFERENCES AND RELATED SUBJECT MATTER

This application is a continuation-in-part of patent application Ser. No. 11/147,841, filed in the United States Patent Office on Jun. 8, 2005 now abandoned.

BACKGROUND OF THE INVENTION

The invention relates to a pet nail filing device. In particular, the invention is a filing device comprising a belt-driven grinding drum for both filing down a pet's nails, and for acclimating the pet for such filing. The pet's nails are held against a rotating grinding drum mounted within a housing and exposed from through openings in a mask cover, thereby both conditioning the nail for grooming and filing the nails.

Pets are companions to many people and are part of many families. Among the most popular household pets are dogs, cats, and birds. Along with owning a pet comes the responsibility of caring for the pet, including tending to the animal's grooming needs.

A common grooming need is clipping the nails of the animal in order to reduce the pain that the animal experiences just by walking around. It is also important to avoid injury to the pet, to others, and damage to property. This task usually involves holding the paw of the animal in one hand and clipping the nails with a clipper held in the other hand. Since the pet is often uneasy during the performance of this task, the animal often moves about in an attempt to escape the owner's hold. Thus, it is often necessary for one person to hold the animal while a second person actually cuts the nails.

Many pet owners are apprehensive when cutting their pets' nails out of concern for hurting the animals. It is very common for the vein growing into the animal's nail to be injured when cutting the nails—causing bleeding and pain to the animal. The longer the nail is allowed to grow, the further the vein extends therein. Thus, it is necessary not only to keep the animal's nails at a shorter length to avoid injury to the animal, but to condition the vein to retract so that the nail can be harmlessly shortened.

There is some suggestion in the prior art to use motor driven manicuring devices—intended for humans—to cut pet nails. These devices resemble hobby cutting tools, such as sold under the tradename DREMEL. Despite any such suggestion by some people, it is not possible, and downright inhumane to use these devices on pets. The noise, vibration, and visual image of moving cutting parts will frighten and hurt the animal.

Thus, there exists a need for a pet nail filing device that would ease the task of keeping a pet's nails short, and greatly reduce the pain experienced by millions of domesticated animals. Such a device would enable the pet owner to keep the pet's nails short without risking any harm to the pet. Further, the nail filing device would eliminate the need of a second person to hold the pet while the trimming is being performed.

While the units available may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved pet nail filing device. As such, the general purpose of the present invention, which will be described subsequently in greater detail, is to provide a new and improved pet nail filing device which has all the advantages of the prior art and none of the disadvantages.

To attain this, the present invention essentially comprises a pet nail filing device for filing down a pet's nails in a quick and painless fashion. The filing device has a housing and a rotating grinding drum within the housing. A motor is connected to a drive belt which causes the grinding drum to rotate while isolating the grinding drum, and thus the animal, from vibration. The grinding drum has an outer surface covered with grit. When the pet's nail is brought into contact with the drum outer surface, the grit coupled with the rotation of the drum both conditions the nail for grooming by causing the vein to retract, and also causes the nail to be filed down. A mask cover exposes only a portion of the grinding drum through openings therein, and thereby avoids trauma to the animal.

It is an object of the invention to produce a pet nail filing device which aids in the shortening of the animal's nails. Accordingly, the pet's nails are simply held against the rotating drum, whereby the grinding drum files down the nails.

It is a further object of the invention to produce a pet nail filing device which eliminates the need for two people to perform the task of cutting the animal's nails. Accordingly, the device requires only one person to hold the pet's nails against the rotating grinding drum. The drum actually performs the task of filing down the nails.

It is a further object of the invention to produce a pet filing device which reduces the risk of injury or infliction of unnecessary pain upon the pet during the cutting of its nails. Accordingly, the rotating drum creates a gentle brushing motion on the nail, and conditions the vein to retract while conditioning the animal to use of the device. The rotating drum merely files down the nails without actually cutting them. Thus, there is a greatly reduced risk of piercing the vein within the nail.

It is a still further object of the invention to reduce trauma to the animal. Accordingly, the belt driven system helps isolate the grinding drum from vibration present at the motor, thereby preventing vibration from being transmitted to the paw of the animal. Also, the use of the mask cover makes the movement of the drum almost imperceptible to the animal. Further, the use of the removable mask cover allows substitution with mask covers having different sized openings, making the nail filing device suitable for use with all pets having nails.

The invention is a pet nail filing device for filing down a pet's nails in a quick and painless fashion. The filing device has a housing and a rotating grinding drum secured positioned within the housing. A motor is connected to the grinding drum through a drive belt, which causes grinding drum to rotate. The grinding drum has an outer surface covered with grit. When the pet's nail is brought into contact with the belt outer surface, the grit coupled with the rotation of the belt both helps the animal get used to the grinding and also causes the nail to be filed. A mask cover exposes only a portion of the grinding drum through openings therein, and thereby avoids trauma to the animal.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 3:
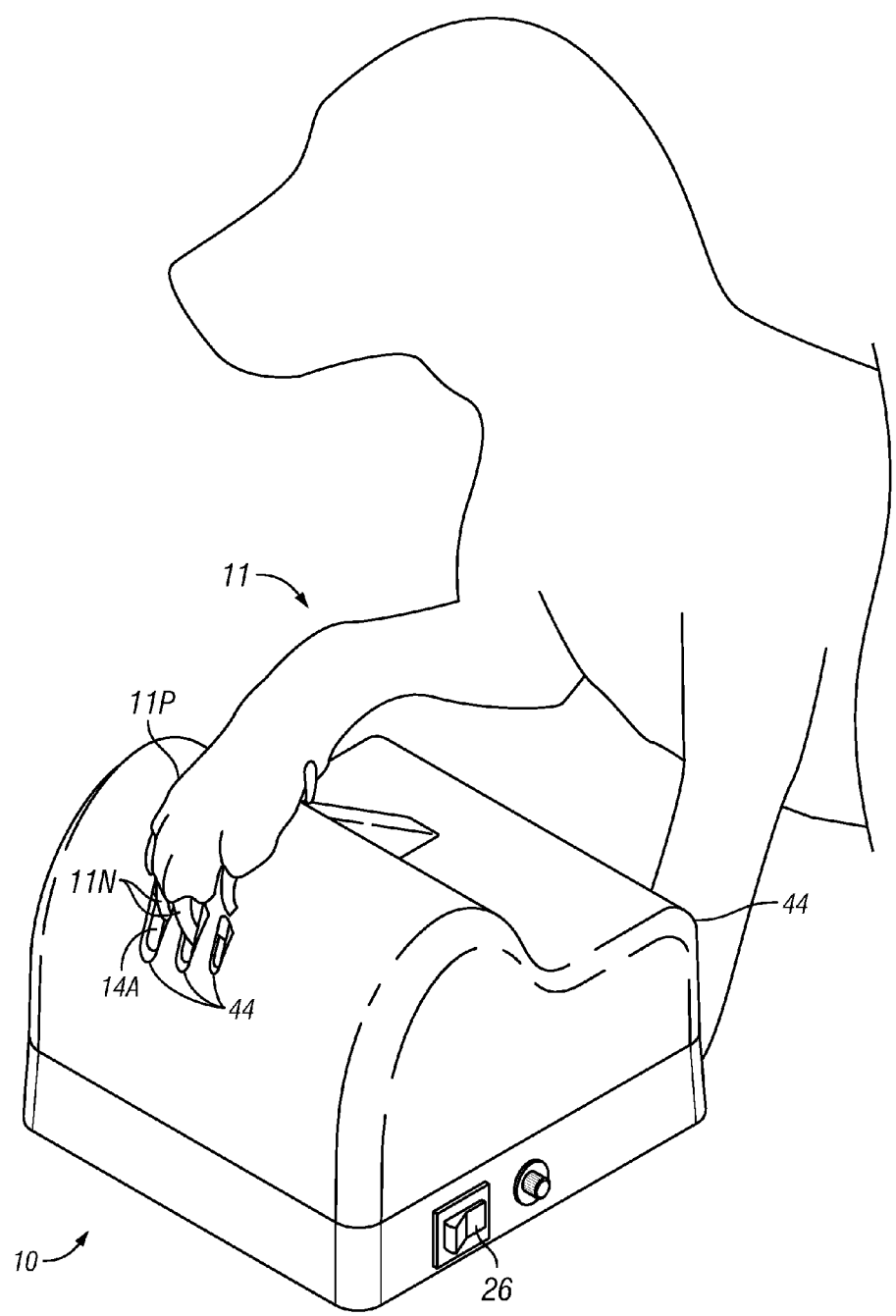
FIG. 3 is a diagrammatic perspective view, illustrating a pet, extending his paw over the housing, and bringing a nail into contact with the grinding drum through one of the openings on the rear of the mask cover.

FIG. 3 illustrates a pet nail filing device 10. The filing device 10 is for use with a pet 11 having a plurality of nails 11N extending from its paw 11P. The pet nails have a vein that grows along the nail, known as a "quick". The filing device 10 is employed for both conditioning the pet's nails for grinding such that the vein retracts to make it safe for filing, and for actually filing down the pet's nails in a quick and painless fashion.

Figure 1:
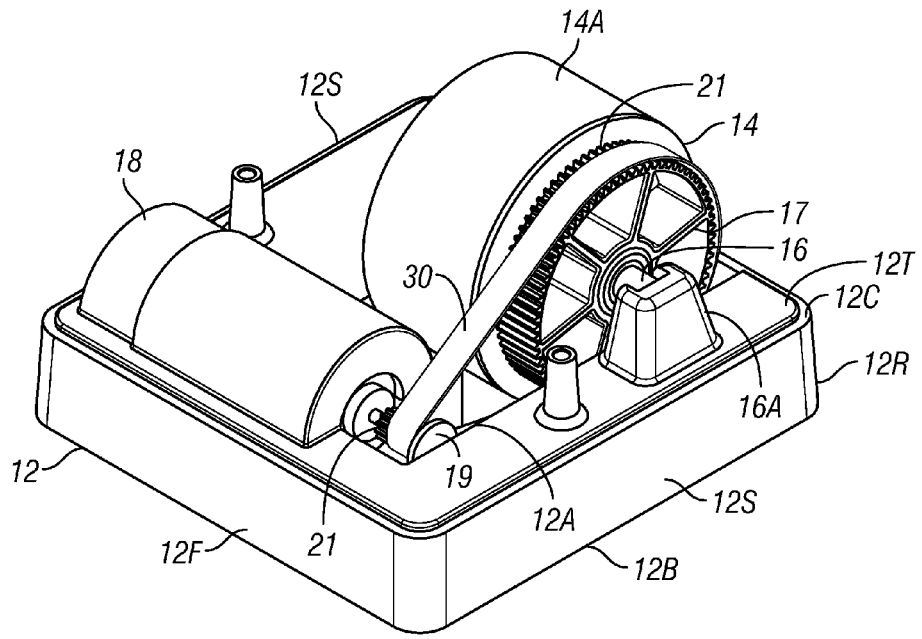
FIG. 1 is a perspective view of the pet nail filing device, per se, with the mask cover removed from the lower housing.

Referring now to FIG. 1, the device 10 essentially comprises a housing 12 and a cylindrical rotating grinding drum 14 secured on an axle 16 positioned within the housing 12. A pulley 17 is mounted on the axle 16 coaxially with the grinding drum 14 and is secured to the grinding drum 14 so that the grinding drum 14 and the pulley 17 rotate together.

The grinding drum 14 has an outer surface 14A covered with grit. Referring momentarily to FIG. 3, when the pet's nail 11N is brought into contact with the grinding drum outer surface 14A, the grit coupled with the rotation of the drum 14 both stimulates the nail to condition it for filing by causing the vein to retract, and also causes the nail to be filed down. This procedure causes no pain or discomfort to the pet and is effective in keeping the pet's nails short.

The housing 12 has a top surface 12T, a bottom surface 12B, a front wall 12F, a rear wall 12R, and a pair of opposed side walls 12S extending therebetween. The top surface 12T of the housing 12 has a perimeter, also has an outer ledge 12C extending around the perimeter on the top surface 12T, along the front wall 12F, rear wall 12R, and side walls 12S. The housing top surface 12T has a top opening 12A within which a portion of the grinding drum 14, pulley 17, and axle 16 is recessed. At least one axle mount 16A protrudes upwardly from the top surface 12T and supports the axle 16 for rotation therein.

A motor 18 is partially recessed within the top surface 12T of the housing 12 and is mounted substantially parallel to the grinding drum 14. In particular, the motor 18 has a drive wheel 19 which is mounted parallel to the axle 16 and is aligned with the pulley 17. A drive belt 30 is tensioned between the drive wheel 19 and pulley 17, such that rotation of the drive wheel 19 causes linear motion of the drive belt 30, which thereby causes rotation of the pulley 17 an thus the grinding drum 14. Accordingly, the motor 18 causes the grinding drum 14 to rotate. This belt drive arrangement, however, effectively isolates the grinding drum 14 from rotation of the motor 18. Note that the drive wheel 19 and pulley 17 have teeth 21. These teeth 21 optionally aid the positive transmission of power through the drive belt 30 between the motor 18 and grinding drum 14.

Figure 2:
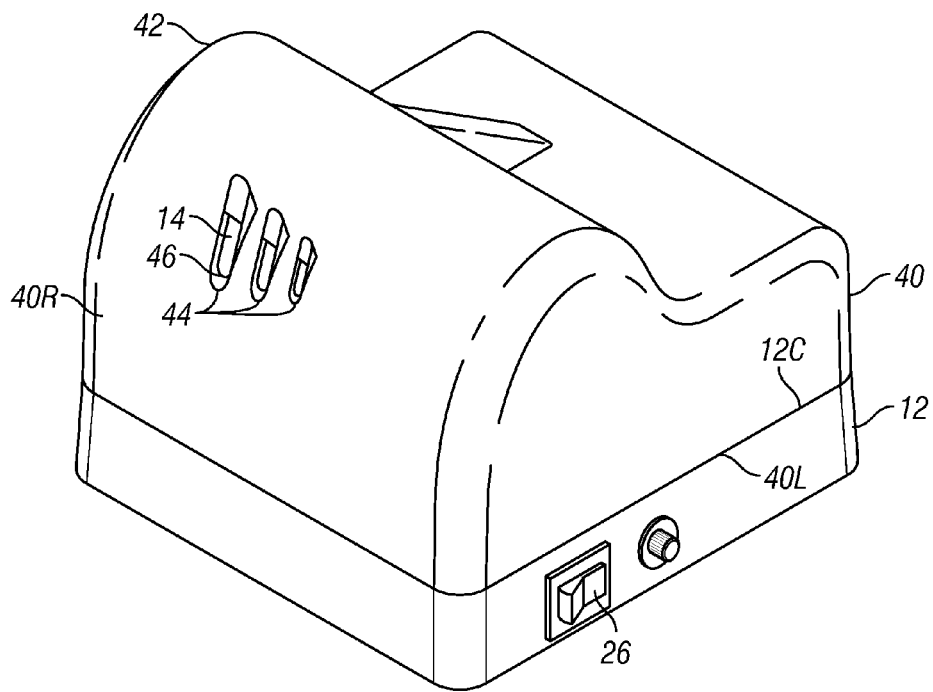
FIG. 2 is a perspective view of the pet nail filing device, with the motor, belt, and grinding drum obscured by a mask cover. The mask cover has various sized openings through which a portion of the grinding drum is exposed.

Referring to FIG. 2, the housing 12 has been covered by a mask cover 40. The mask cover 40 has a lower edge 40L which is sized and shaped to fit directly upon the outer ledge 12C of the housing 12. The mask cover 40 fits over the motor, drive belt 30, and grinding drum 14 and substantially conceals the same. The mask cover 40 has a hump 42 which is curved upwardly to extend over the grinding drum 14. The mask cover 40 has a rear wall 40R, which is curved to accommodate the grinding drum 14, and which has small vertical openings 44 through which the grinding drum 14 is exposed. The vertical openings 44 are each substantially oval in shape and each have a beveled edge 46 to help smooth transitions between the grinding drum 14 and the mask cover 40 to prevent injury to the animal. The grinding wheel extends within close proximity of the rear wall 42, immediately adjacent to the openings 44.

In use, as seen in FIG. 3, a pet 11 is positioned in front of the front wall 12F, and the pet's paw 11P is extended over the housing 12 toward the rear wall 12R of the housing 12, and brought into proximity with one of the openings 44. The nail 11N to be filed is brought into contact with the grinding drum 14 through one of the openings 44. Since the paw 11P is extended over the mask cover 40 and the openings are on the mask cover rear wall 40R which is curved downwardly, the pet doesn't even see the grinding surface. This greatly aids the pet's comfort and facilitates cooperation of the pet. Note that the openings 44 include a small, medium, and large opening, the openings 44 substantially in the range of 0.1 to 0.2 inches in width and in length. To provide sufficient guidance to those skilled in the art to practice the invention, preferred sizes for the small, medium, and large openings 44 are 0.110, 0.140, and 0.170 inches in width (transversely), and 0.124, 0.145, and 0.169 in length (vertically). Advantageously with the present invention, the mask cover 44 can be replaced, with other mask covers 44 having different sized openings, for use with animals of all sizes, etc. By substituting the mask cover 44 in this manner, the nail filing device can be adapted for use with all domesticated animals.

A preferred manner of conditioning the pet, such that the filing operation is pain-free, is to start by exposing the nail to the belt through the smallest opening, and then on subsequent days, exposing the nail to the next larger opening, until the largest opening is reached. Within a week, the pet will be conditioned for pain-free nail filing. When exposing the nail to the grinding drum 14 through the openings 44 in this manner, the pet feels a gentle brushing sensation, and thus is not bothered or traumatized by the filing operation. In fact, due in part to the configuration of the housing 12 such that the paw extends over the housing and the openings are at the rear wall of the mask cover, the pet barely knows that anything at all is taking place.

A power switch 26 may be is positioned on the housing 12, preferably on one of the side surfaces 12S. This power switch controls the operation of the motor 18, and further the rotation of the idler wheels 16 and the belt 14.

In conclusion, herein is presented a pet nail filing device. The invention is illustrated by example in the drawing figures, and throughout the written description. It should be understood that numerous variations are possible, while adhering to the inventive concept. Such variations are contemplated as being a part of the present invention.

What is claimed is:

1. A pet nail filing device, for use with a pet, having a paw having a plurality of nails extending therefrom, comprising:
   a housing having a top surface having a perimeter, and an outer ledge extending around the perimeter of the top surface;
   a grinding drum, mounted within the housing and exposed through the top surface, the grinding drum having an outer grinding surface covered with grit;
   a motor, for selectively driving the grinding drum;

a drive belt, connecting the grinding drum and motor, for allowing the motor to rotate the grinding drum and minimizing the transmission of vibration from the motor to the grinding drum, so that when the nails of the pet are brought into proximity with the grinding drum the nails are filed with reduced trauma to the pet; and a mask cover, the mask cover sized to fit on the outer ledge of the housing and conceal the motor, grinding drum, and drive belt therebelow, the mask cover has a rear wall which is substantially vertical and has a hump that curves to extend over the grinding drum for allowing the paw to extend over the hump, the mask cover has at least one opening which exposes a small portion of the grinding drum surface therethrough, for allowing the paw to extend over the hump so that the nail is brought into contact with the grinding drum surface through said opening while minimizing trauma to the pet by avoiding having the pet see the grinding wheel.

2. The pet nail filing device as recited in claim 1, wherein the at least one opening further comprises small, medium, and large openings on the rear wall of the mask cover, for allowing the pet's paw to extend over the hump toward the rear wall, for increasing comfort and cooperation of the pet by avoiding having the pet see the grinding drum.

3. The pet nail filing device as recited in claim 2, wherein the openings are substantially in the range of 0.1 to 0.2 inches in width and in length.

4. The pet nail filing device as recited in claim 3, wherein mask cover is removable attached onto the ledge of the housing, so that it can be easily replaced with another mask cover having different sized openings.

* * * * *